US007785190B2

(12) United States Patent
Aida

(10) Patent No.: US 7,785,190 B2
(45) Date of Patent: Aug. 31, 2010

(54) SLOT MACHINE

(75) Inventor: Eiji Aida, Zama (JP)

(73) Assignee: Konami Gaming, Incorporated, Las Vegas, NV (US)

(*) Notice: Subject to any disclaimer, the term of this patent is extended or adjusted under 35 U.S.C. 154(b) by 707 days.

(21) Appl. No.: 11/802,042

(22) Filed: May 18, 2007

(65) Prior Publication Data

US 2007/0293299 A1 Dec. 20, 2007

(30) Foreign Application Priority Data

Jun. 1, 2006 (JP) ............................ 2006-153730

(51) Int. Cl.
*G06F 17/00* (2006.01)

(52) U.S. Cl. ........................................................ 463/20

(58) Field of Classification Search .............. 463/16–25
See application file for complete search history.

(56) References Cited

U.S. PATENT DOCUMENTS

| | | | | |
|---|---|---|---|---|
| 5,695,188 A * | 12/1997 | Ishibashi | ................ | 273/143 R |
| 6,009,048 A | 12/1999 | Raesz | | |
| 6,259,866 B1 | 7/2001 | Kabumoto et al. | | |
| 2003/0153385 A1 | 8/2003 | Ikeya et al. | | |
| 2007/0167215 A1* | 7/2007 | Majima et al. | ................ | 463/17 |
| 2008/0064466 A1* | 3/2008 | Saito | ........................... | 463/16 |
| 2008/0064484 A1* | 3/2008 | Saito | ........................... | 463/20 |
| 2009/0017900 A1* | 1/2009 | Fujimoto et al. | .............. | 463/20 |
| 2009/0017901 A1* | 1/2009 | Fujimoto et al. | .............. | 463/20 |
| 2009/0017902 A1* | 1/2009 | Fujimoto et al. | .............. | 463/20 |
| 2009/0054129 A1* | 2/2009 | Yoshimura et al. | ............ | 463/20 |

FOREIGN PATENT DOCUMENTS

| | | | |
|---|---|---|---|
| JP | 06-003650 | A | 1/1994 |
| JP | 07-245735 | A | 9/1995 |
| JP | 2002-078845 | A | 3/2002 |
| JP | 2003-225350 | A | 8/2003 |
| JP | 2005-073842 | A | 3/2005 |

* cited by examiner

*Primary Examiner*—Ronald Laneau
(74) *Attorney, Agent, or Firm*—Global IP Counselors, LLP

(57) ABSTRACT

In a slot machine, the display unit includes a region on which a plurality of symbol columns and rows are displayed. Normal directions of surfaces of the region, on which the symbol columns placed at both ends of the symbol rows are displayed, intersect in front of the display unit. The display unit preferably includes mechanical reels placed at ribs of a fan. Normal directions of circumferential surfaces of the mechanical reels at the forward ends thereof intersect at substantially the same point, and thereby the front ends oppose a player. The display unit may be alternatively an electronic display device that includes a curved or bent screen. Normal directions of surfaces on which video reels are displayed intersect at substantially the same point, and thereby the surfaces oppose a player.

7 Claims, 12 Drawing Sheets

SLOT MACHINE

CROSS-REFERENCE TO RELATED APPLICATIONS

This application claims priority to Japanese Patent Application No. 2006-153730, filed on Jun. 1, 2006. The entire disclosure of Japanese Patent Application No. 2006-153730 is hereby incorporated herein by reference.

BACKGROUND OF THE INVENTION

1. Field of the Invention

The present invention relates to a slot machine. In particular, the present invention relates to a slot machine display unit to display symbols.

2. Background Information

A slot machine installed in a casino or the like displays a plurality of symbol columns and rows. Each symbol column includes two or more types of symbols arranged in a predetermined order. Each symbol column is preferably displayed on a circumferential surface of a mechanical reel. Each time the mechanical reels repeatedly spin and stop, an arrangement of visible symbols is changed. Alternatively, symbol columns may be displayed on a screen of an electronic display device in a graphic form (i.e., video reels). The arrangement of symbols visible on the mechanical reels or the screen includes one or more paylines. Here, a payline is a series of symbols, and in particular, includes one symbol on each mechanical/video reel. A player enters an amount of credits as a bet into the slot machine. The bet is, in general, allowed to be placed on each payline. After the player has placed one or more bets, the slot machine randomly determines a symbol to be displayed on each reel at a stopped position. The slot machine then checks if a winning combination will be formed on a payline in the arrangement of symbols on the stopped reels. In parallel with that, the slot machine starts a spin of the mechanical/video reels. After a predetermined time has elapsed, for example, the slot machine stops the spin of the mechanical/video reels, and displays the arrangement of symbols thereon. The slot machine then provides the player with an award (e.g., an amount of credits) depending on the bet and the winning combination found in the arrangement of symbols.

In a prior art slot machine as shown in FIG. 9, mechanical reels 100A-100E are coaxially placed, and in particular, the forward ends 101*e* thereof are placed on the same flat plane. Similarly, video reels are displayed on a flat screen in a prior art slot machine. Accordingly, the symbol columns placed on both ends of symbol rows (i.e., on the first and fifth mechanical reels 100A and 100E) are less visible to a player P than at the center thereof (i.e., on the third mechanical reel 100C). In particular, some players absorbed in games tend to approach and gaze at the reels. The less visibility of the symbol columns placed at both the ends causes such players to feel more discomfort. The less visibility also restricts a number of mechanical reels per slot machine, and accordingly, a number of possible arrangements of symbols. This prevents the maximum amount of payout from increasing. The less visibility is further serious for video reels since image quality of a general display device (in particular, an LCD) is degraded at larger view angles. The less visibility also prevents the display device from having a larger screen, and accordingly prevents more flexible designs of a slot machine.

In view of the above, it will be apparent to those skilled in the art from this disclosure that there exists a need for an improved slot machine that can display more visible symbol columns placed on both ends of symbol rows. This invention addresses this need in the art as well as other needs, which will become apparent to those skilled in the art from this disclosure.

SUMMARY OF THE INVENTION

According to the present invention, a slot machine comprises a display unit, a console unit, a credit manager unit, a start signal generator unit, a lottery unit, a display controller unit, a winning judgment unit, and an award processor unit. The display unit includes a region on which a plurality of symbol columns and rows are displayed. Each symbol column includes two or more types of symbols arranged in a predetermined order. Normal directions of surfaces of the region, on which the symbol columns placed at both ends of the symbol rows are displayed, intersect in front of the display unit. The console unit is configured to accept data from a player. The credit manager unit is configured to store credit data indicating an amount of credits available to the player, and update the credit data to reduce the amount of the credits by an amount of a bet indicated by bet data when the console unit has accepted the bet data from the player. The start signal generator unit is configured to generate a start signal after the credit manager unit has reduced the credits by the bet. The lottery unit is configured to determine an arrangement of symbols to be displayed on the display unit in response to the start signal. The display controller unit is configured to start continuously moving the symbol columns displayed on the display unit in response to the start signal, and after that, stop the symbol columns and display the arrangement of symbols that the lottery unit has determined. The winning judgment unit is configured to check if a winning combination will be included in the arrangement of symbols. The award processor unit is configured to provide the player with an award in accordance with the bet data and type of the winning combination that the winning judgment unit has found in the arrangement of symbol.

Normal directions of surfaces of the region on which the symbol columns placed at both ends of the symbol rows are displayed, intersect in front of the display unit. Accordingly, a player's line of sight is easy to place in the normal direction of the surface on which each symbol column is displayed. Thus, the symbol columns placed at both ends are plainly visible as well as the symbol columns placed at the center of the symbol rows, regardless of the symbol columns displayed on mechanical or video reels.

The display unit preferably comprises a plurality of mechanical reels including a circumferential surface on which each symbol column is displayed, and a motor unit configured to rotate the mechanical reels. In this case, a portion of the circumferential surface of each mechanical reel is visible in the region of the display unit. Moreover, normal directions of the circumferential surfaces of the mechanical reels placed at both ends of the region intersect in front of the display unit. More preferably, normal directions of the circumferential surfaces of all the mechanical reels intersect at substantially the same point in front of the display unit. As a result, forward ends of the circumferential surfaces of all the mechanical reels oppose a player. Thus, any symbol column is easy for the player to see with uniformly bright clarity.

More preferably, the distance between forward ends of the circumferential surfaces of the adjacent mechanical reels is smaller than the distance between back ends of the adjacent mechanical reels. In other words, the mechanical reels are positioned as ribs of a fan when seen from the top. This reduces a gap between the adjacent symbol columns so as to be plainly visible while maintaining a sufficiently large distance between the center portions of the adjacent mechanical reels within which the motor unit is to be placed. In addition, all the forward ends of the mechanical reels are placed on a substantially smooth envelope curve. This further enhances the visibility of symbol columns.

The display unit preferably comprises a transparent panel that is placed across the above region of the display unit and opposed to each circumferential surface of the mechanical reels at a fixed distance from the circumferential surfaces. This also enhances the visibility of symbol columns.

The display unit may comprise an electronic display device configured to display the symbol columns in a graphic form (i.e., video reels) on a screen placed at the above region of the display unit. The display unit may display the video reels instead of or in addition to the mechanical reels. Normal directions of surfaces of the screen, on which the symbol columns placed at both ends of the symbol rows are displayed, may intersect in front of the display unit. This enhances image quality of the symbol columns placed at both ends since a player's line of sight is easy to place in the normal direction of the surface on which each symbol column is displayed; even if the electronic display device uses an LCD with a limited viewing angle.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a portion of this original disclosure.

DETAILED DESCRIPTION OF THE PREFERRED EMBODIMENT

Preferred embodiments of the present invention will now be explained with reference to the drawings. It will be apparent to those skilled in the art from this disclosure that the following description of the preferred embodiments of the present invention are provided for illustration only and not for the purpose of limiting the invention as defined by the appended claims and their equivalents.

Embodiment 1

Figure 2:
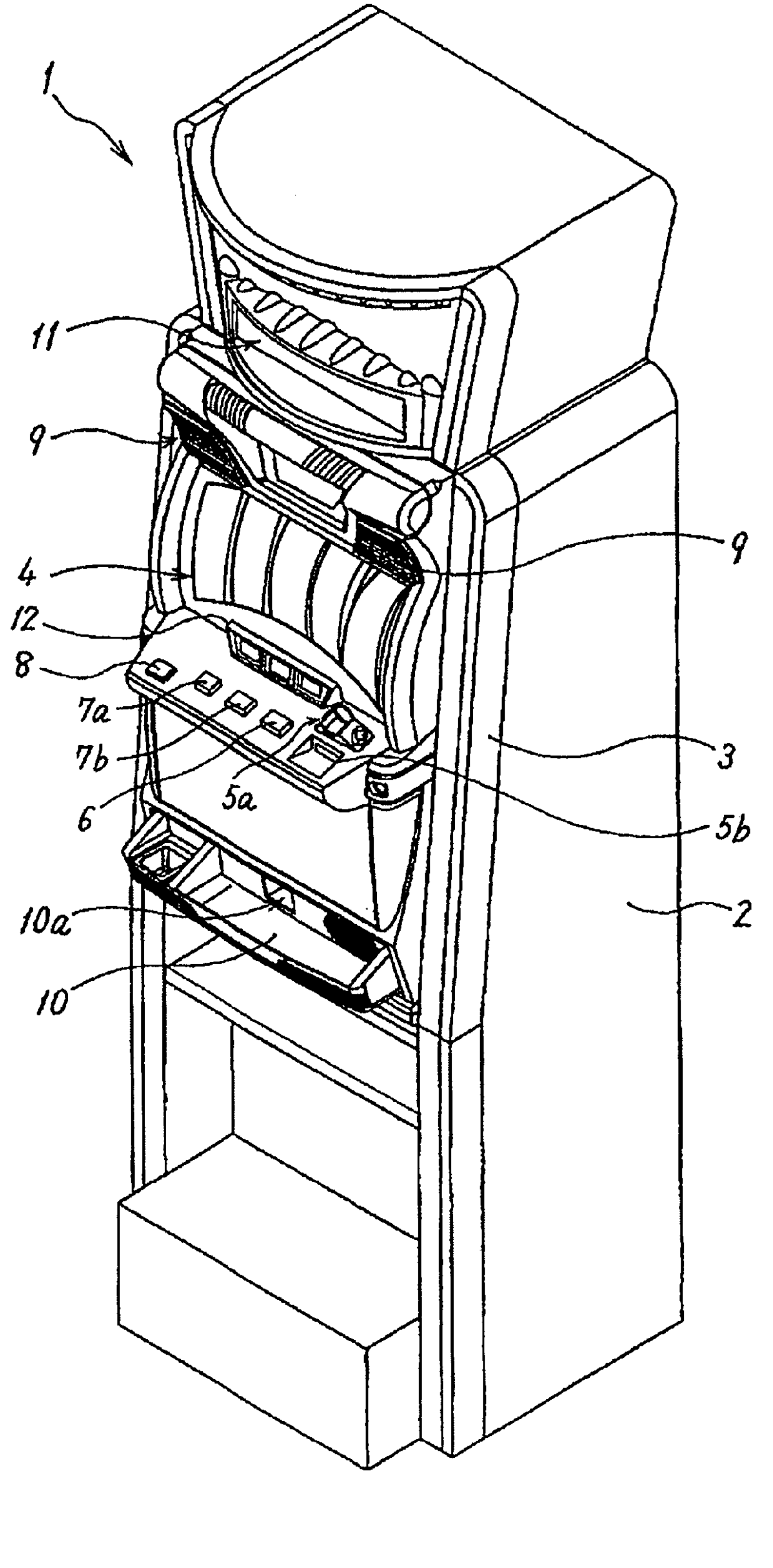
FIG. 2 is a perspective view of the appearance of the slot machine shown in FIG. 1.

A first preferred embodiment of the present invention is a slot machine preferably installed in a casino. As shown in FIG. 2, the slot machine 1 includes a box-shaped cabinet 2, and a front panel 3 that is coupled to the front of the cabinet 2. The front panel 3 is capable of being opened and closed. A display unit, a display window 4, a coin slot 5*a*, a bill slot 5*b*, a spin button 6, bet buttons 7*a* and 7*b*, a cash out button 8, speakers 9, a coin tray 10, a monitor 11, and credit/bet/payout meters 12 are disposed at the front panel 13. The display unit includes five mechanical reels 100A-100E on which symbols are displayed. The five mechanical reels 100A-100E are visible through the display window 4. The spin button 6, the bet buttons 7*a* and 7*b*, and the cash out button 8 constitute a console unit and accept data from a player. When a player pushes the spin button 6, the mechanical reels 100A-100E starts to spin. Then, symbols start moving in a vertical direction in the display window 4. A player inserts coins and bills into the coin slot 5*a* and the bill slot 5*b*, respectively. The inserted coins and bills are counted by a coin counter installed inside the cabinet 2 (not shown in FIG. 2). The count of the coins and bills is displayed as the number of available credits on the credit meter 12. A player uses the bet buttons 7*a* and 7*b* to select paylines and place bets thereon. The amount of the bets is displayed on the bet meter 12. If a payout has been won, the amount of the payout is displayed on the payout meter 12. When a player pushes the cash out button 8, coins equivalent to the payout are discharged from a coin chute 10*a*, and then stored in the coin tray 10. The spin button 6, the bet button 7*a* and 7*b*, and the cash out button 8 are preferably lamp buttons with light emitting devices which emit light when pushed. Alternatively, one or more of the spin button 6, the bet button 7*a* and 7*b*, and the cash out button 8 may be replaced with one or more touch panels installed on the cabinet 2. The monitor 11 preferably uses a matrix of LEDs, or alternatively, may be a CRT, an LCD, a PDP, or an OLED. The monitor 11 is used for visual effect in slot games.

Figure 3:
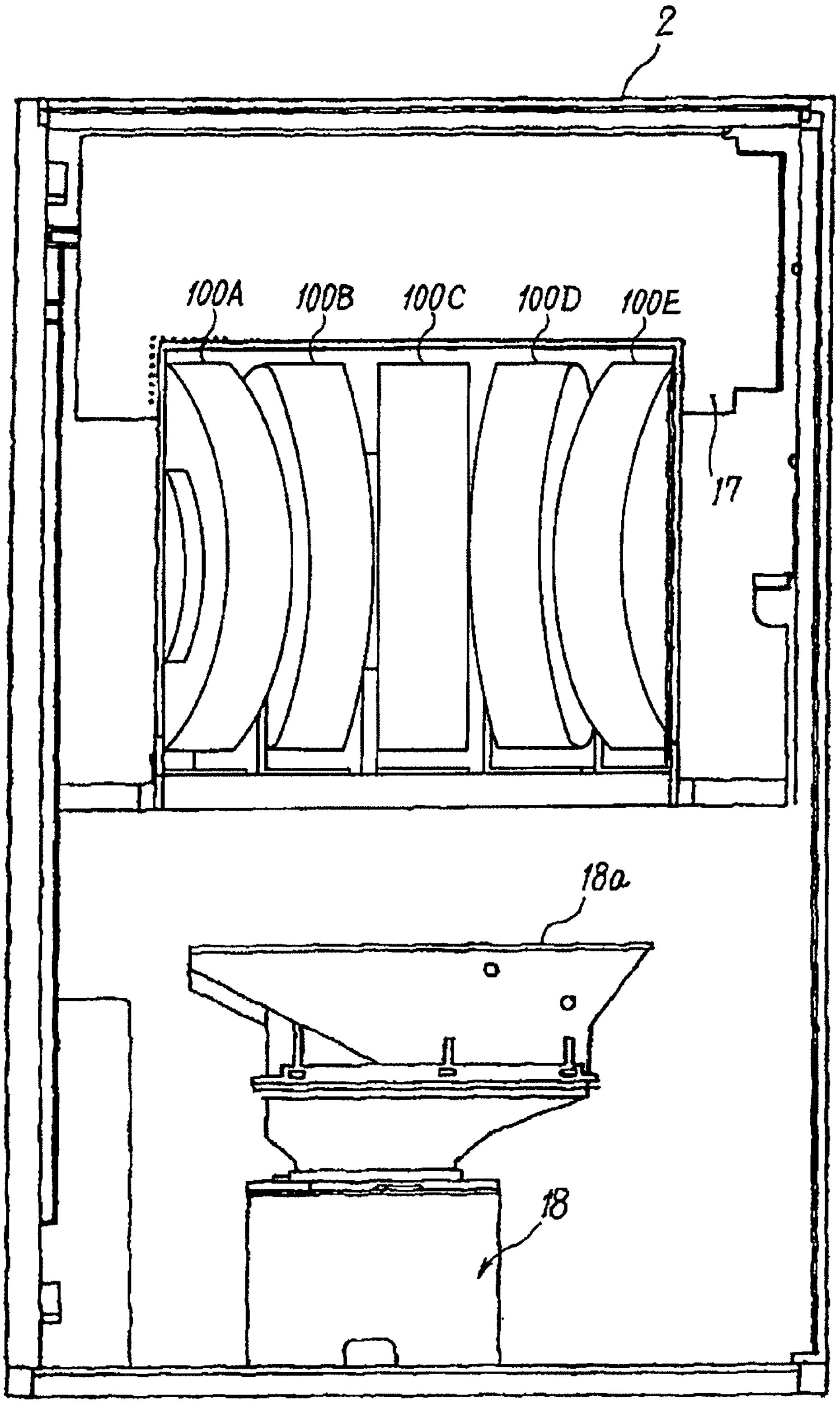
FIG. 3 is a front view of the inside of the slot machine shown in FIG. 2.

As shown in FIG. 3, the five mechanical reels 100A, 100B, 100C, 100D, and 100E are preferably installed in the cabinet 2. The mechanical reels 100A, 100B, 100C, 100D, and 100E have a common structure. A symbol column is displayed on a circumferential surface of each of the mechanical reels 100A, 100B, 100C, 100D, and 100E. Each symbol column includes two or more types of symbols (e.g., "star"-, "sun"-, "lightning"-, or "7"-shaped symbols) or blanks that are placed in a predetermined order and regular intervals. Different symbol columns are displayed on different mechanical reels 100A, 100B, 100C, 100D, and 100E.

As shown in FIG. 3, a main control board 17 and a coin payout device 18 are installed inside the cabinet 2. Various electronic devices, e.g., a CPU, a RAM, and a ROM, are implemented on the main control board 17, and thereby constitute a game controller unit. The coin payout device 18 includes a hopper 18*a* configured to hold a large number of coins. The coin payout device 18 discharges a predetermined number of coins through the coin chute 10*a* to the coin tray 10.

Figure 4:
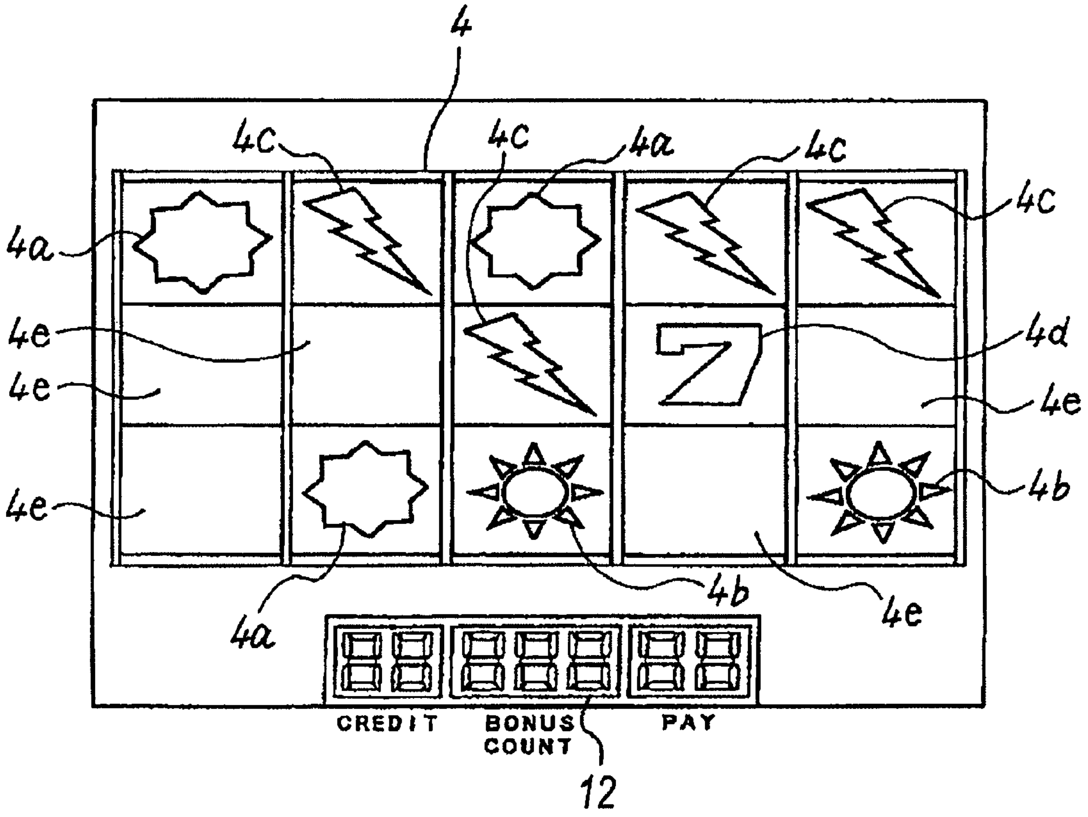
FIG. 4 is a front view of a display unit mounted on the slot machine shown in FIG. 2.

As shown in FIG. 4, three symbols or blanks are visible on each of the five stopped mechanical reels 100A, 100B, 100C, 100D, and 100E through the display window 4. More specifically, a "star" symbol 4*a* and two blanks 4*e* are arranged on the first reel 100A. A "lighting" symbol 4*c*, a blank 4*e*, and a "star" symbol 4*a* are arranged on the second reel 100B. A "star" symbol 4*a*, a "lightning" symbol 4*c*, and a "sun" symbol 4*b* are arranged on the third reel 100C. A "lighting" symbol 4*c*, a "7" symbol 4*d*, and a blank 4*e* are arranged on the fourth reel 100D. A "lightning" symbol 4*c*, a blank 4*e*, and a "sun" symbol 4*b* are arranged on the fifth reel 100E. For example, if three or more symbols of the same type (i.e., a winning combination of symbols) appear in the 3×5 symbol matrix visible in the display window 4, an award will be provided to a player (i.e., a winning of an award is determined in a "scatter" scheme). The type of the award is determined by the type and number of the three or more symbols. The types of awards include predetermined amounts of credits and rights to play a special game such as an event, a bonus game, a feature game, or the like.

Note that a winning of an award may be determined in another scheme using the 3×5 symbol matrix visible in the display window 4. In a "line" scheme, for example, one or more paylines may be assigned to rows, columns, or diagonals in the symbol matrix. If three or more symbols of the same type (i.e., a winning combination of symbols) appear on a payline in the symbol matrix displayed on the stopped reels, an award will be provided to a player. In a "neighboring" scheme, for example, if two adjacent symbols of the same type (i.e., a winning combination of symbols) appear in the symbol matrix displayed on the stopped reels, an award will be provided to a player. In both the schemes, the type of the award is determined by the type and number of the symbols included in the winning combination.

Figure 5:
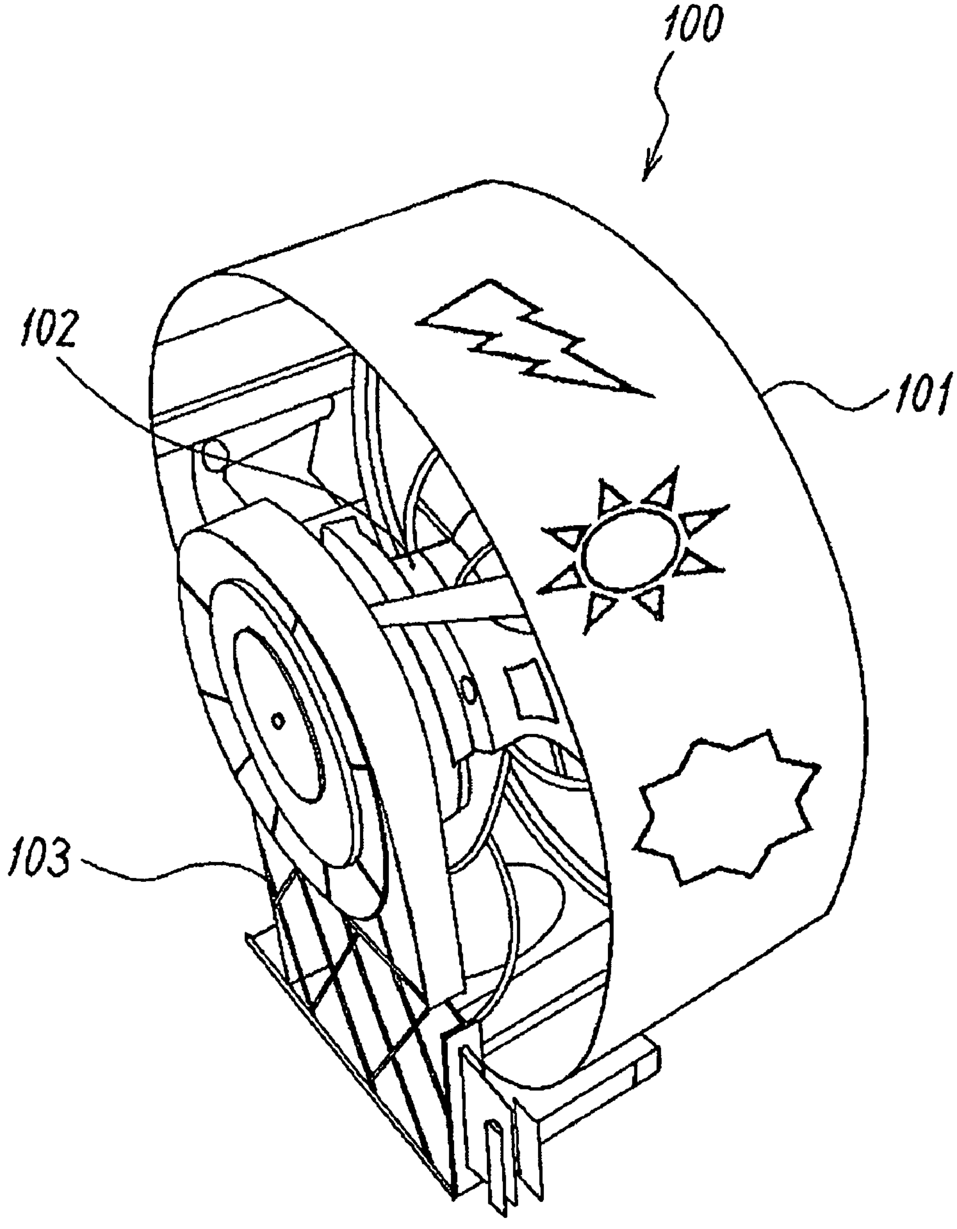
FIG. 5 is a perspective view of a mechanical reel shown in FIG. 1.
Figure 6:
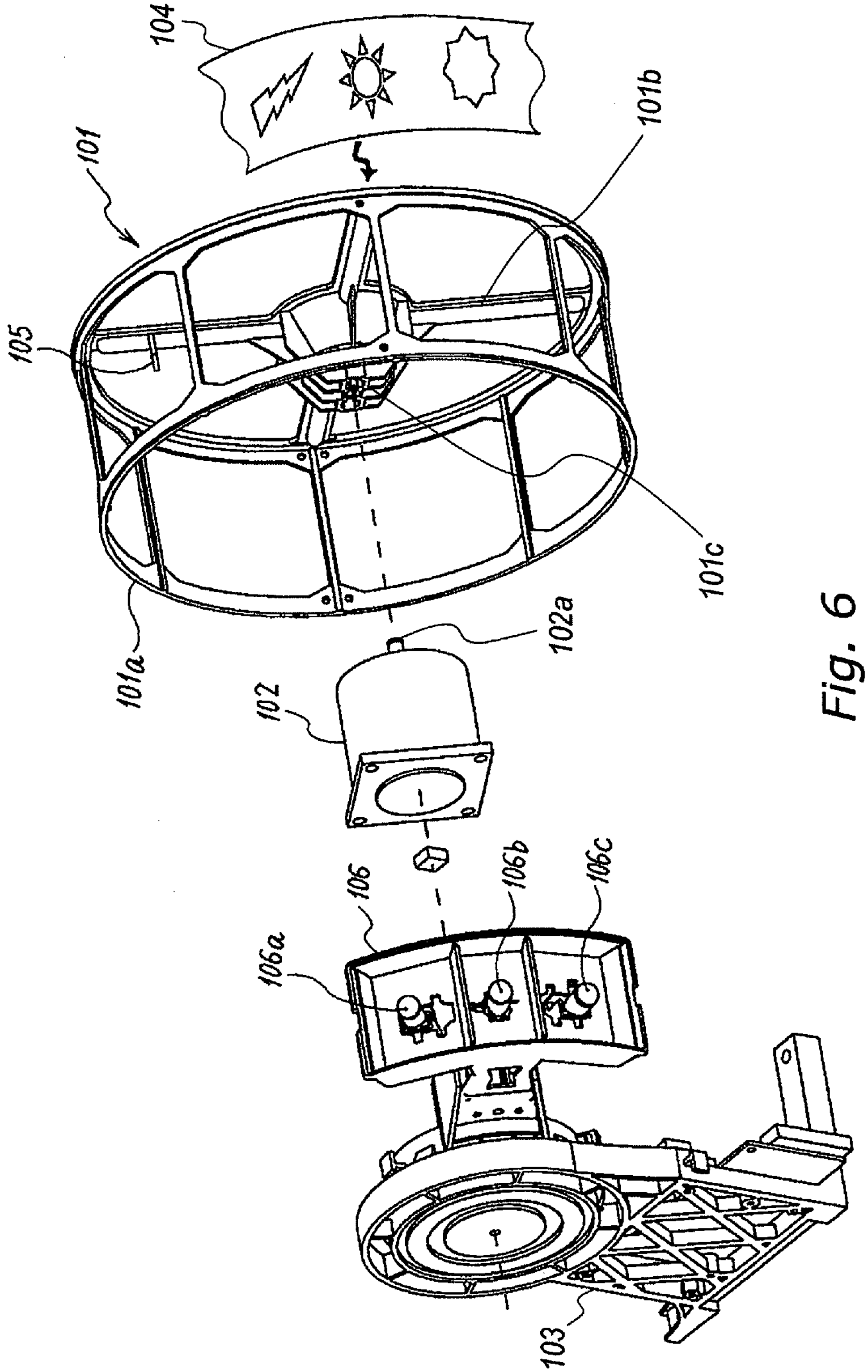
FIG. 6 is an exploded perspective view of the mechanical reel shown in FIG. 5.

FIGS. 5 and 6 show the first mechanical reel 100A. Other mechanical reels 100B-100E have the same structure as the first mechanical reel 100A. The first mechanical reel 100A has a reel member 101, a motor unit 102, and a supporting member 103. The reel member 101 preferably includes a drum-shaped frame 101*a* and a reel strip 104. The frame 101*a* is preferably made of transparent ABS resins. The frame 101*a* preferably includes a ladder connected in a loop and four spokes 101*b*, which are integrally molded. The frame 101*a* looks like a treadmill for hamsters or squirrels. The four spokes 101*b* are preferably provided on a side of the frame 101*a*. The spokes 101*b* are connected between a center portion 101*c* and a rim of the frame 101*a* in the radial direction. The center portion 101*c* of the frame 101*a* is coupled to a shaft 102*a* of the motor unit 102. One of the four spokes 101*b* preferably includes a plate 105 for detection, which protrudes toward the inside of the frame 101*a*. The reel strip 104 is wound around the frame 101*a*, and fixed thereon preferably with an adhesive. The reel strip 104 then forms the circumferential surface of the reel member 101. A symbol column is printed on the entire reel strip 104. The motor unit 102 preferably includes a stepping motor. The supporting member 103 is fixed on the inside of the cabinet 2, and firmly supports the motor unit 102. When the motor unit 102 is driven, the reel member 101 spins around the shaft 102*a* of the motor unit 102.

As shown in FIG. 6, a backlight unit 106 is fixed on the supporting member 103, and positioned at the inside of the frame 101*a*. The backlight unit 106 opposes the display window 4 through the reel strip 104, and illuminates the inner surface of the reel strip 104. The backlight unit 106 is preferably divided into three portions. The backlight unit 106 includes a plurality of lighting units 106*a*, 106*b* and 106*c*. One of the lighting units 106*a*, 106*b*, and 106*c* (preferably, an LED) is placed in each of the three portions. Each of the lighting units 106*a*, 106*b*, and 106*c* illuminates one symbol visible in the display window 4.

A position sensor is preferably mounted on the back side of the backlight unit 106 (not shown in FIG. 6). The position sensor preferably includes a pair of an LED and a photodetector, which oppose each other. In a general position of the reel member 101, the photodetector can detect light emitted from the LED. When the reel member 101 revolves, the plate 105 periodically passes through a gap between the pair, and prevents the photodetector from detecting the light of the LED. The position sensor then detects the plate 105 passing the gap, and sends a specific signal to the main control board 17. A main CPU on the main control board 17 counts the signals, and calculates the position of the reel member 104 from frequencies of the signals. Thus, the game controller unit is configured to monitor the positions of the mechanical reels 100A-100E, and in particular identify symbols (or blanks) visible through the display window 4.

Figure 7:
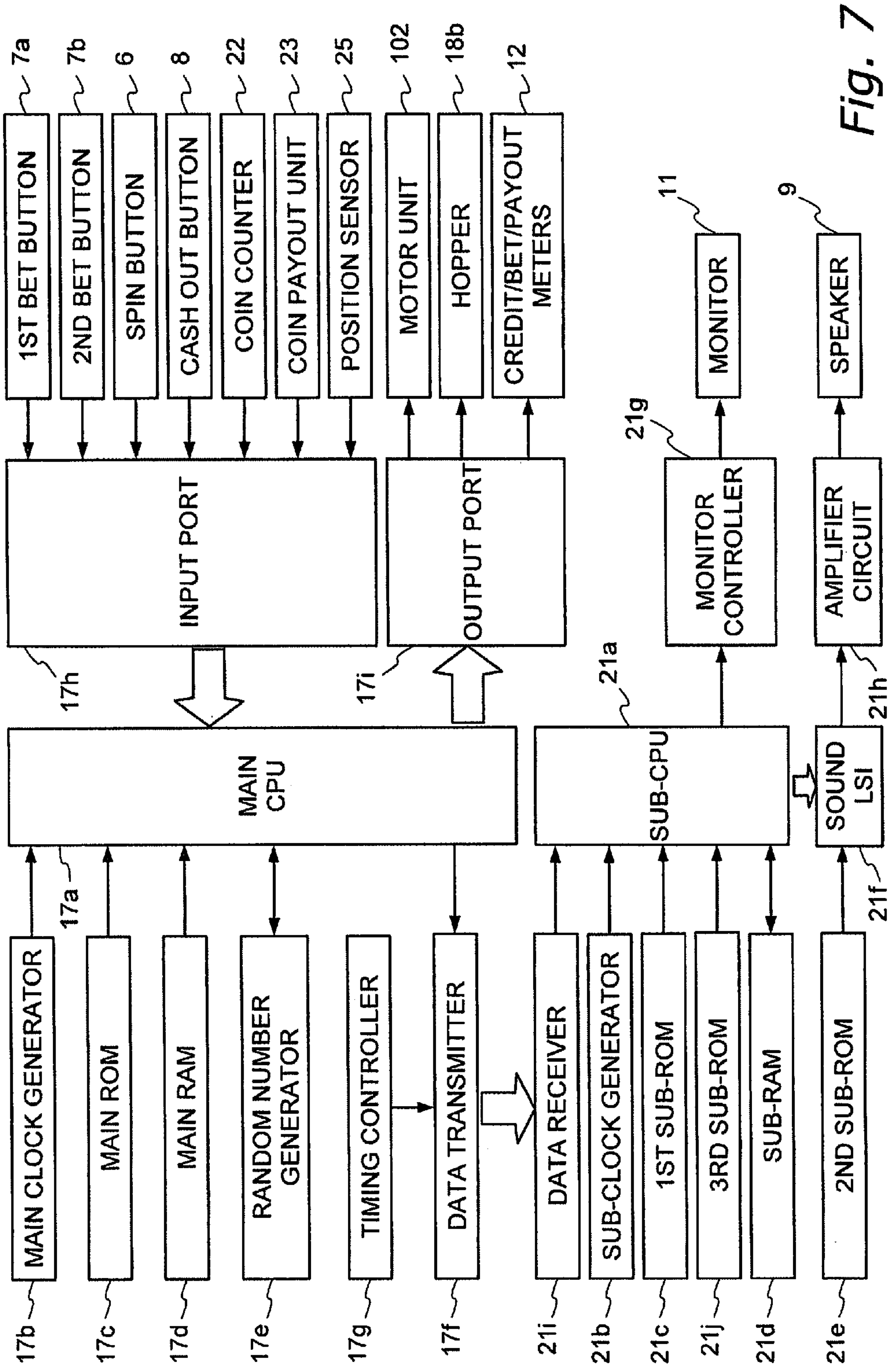
FIG. 7 is a functional block diagram of the slot machine shown in FIG. 2.

As shown in FIG. 7, the slot machine 1 further includes the main control board 17 and a sub-control board 21. The sub control board 21 is preferably separated from the main control board 17, and placed on a back side of the front panel 3. Alternatively, the two control boards may be integrated into a single board, and share the same CPU, ROM, or RAM.

The main control board 17 includes a main CPU 17*a*, a main clock generator 17*b*, a main ROM 17*c*, a main RAM 17*d*, a random number generator 17*e*, a data transmitter 17*f*, a timing controller 17*g*, an input port 17*h*, and an output port 17*i*. The main clock generator 17*b* provides the main CPU 17*a* with main clock signals at a predetermined frequency. The main ROM 17*c* stores various programs and data, in particular, game programs and tables for a lottery process. The main CPU 17*a* invokes the programs and reads the data from the main ROM 17*c*, and thereby controls other components implemented on the main control board 17. The main CPU 17*a* in particular conducts slot games. The main RAM 17*d* temporally stores results computed by the main CPU 17*a*. The random number generator 17*e* generates and provides one or more random numbers to the main CPU 17*a* at predetermined intervals. The data transmitter 17*f* transmits data from the main CPU 17*a* to the sub-control board 21. The timing controller 17*g* controls the timing of the data transmission from the data transmitter 17*f* to the sub-control board 21. The main CPU 17*a* receives various signals through the input port 17*h* from the buttons 6, 7*a*, 7*b*, 8, the coin counter 22, the coin payout unit 23, and the position sensors 25 of the mechanical reels 100A-100E. The main CPU 17*a* further transmits various control signals through the output port 17*i* to the motor units 102 of the mechanical reels 100A-100E, the hopper 18*a* (in particular, built-in motors) of the coin payout unit 18, and the meters 12.

The sub-control board 21 includes a sub-CPU 21*a*, a sub-clock generator 21*b*, a first sub-ROM 21*c* for visual effects, a sub-RAM 21*d*, a second sub-ROM 21*e* for sound effects, a sound LSI 21*f*, a monitor controller 21*g*, an amplifier circuit 21*h*, a data receiver 21*i*, and a third sub-ROM 21*j* for control. The sub-clock generator 21*b* provides the sub-CPU 21*a* with sub-clock signals at a predetermined frequency. The third sub-ROM 21*j* stores various programs and data for control over other components implemented on the sub-control board 21. The sub-CPU 21*a* invokes the programs and data from the third sub-ROM 21*j*, and thereby controls the other components. The data receiver 21*i* receives data from the data transmitter 17*f*, and transmits it to the sub-CPU 21*a* at an appropriate time. The first sub-ROM 21*c* stores various programs and data for visual effects on the monitor 11. The sub-CPU 21*a* invokes the programs and data from the first sub-ROM 21*c*, and thereby controls the monitor controller 21*g* to produce visual effects in slot games on the monitor 11. The sub-RAM 21*d* temporally stores results computed by the sub-CPU 21*a*. The second sub-ROM 21*e* stores various sound data for voice announcements and sound effects from the speaker 9. The sub-CPU 21*a* controls the sound LSI 21*f* to read the sound data from the second sub-ROM 21*e*, and reproduce the voice announcements and sound effects by using the amplifier circuit 21*h* and the speaker 9.

Figure 8:
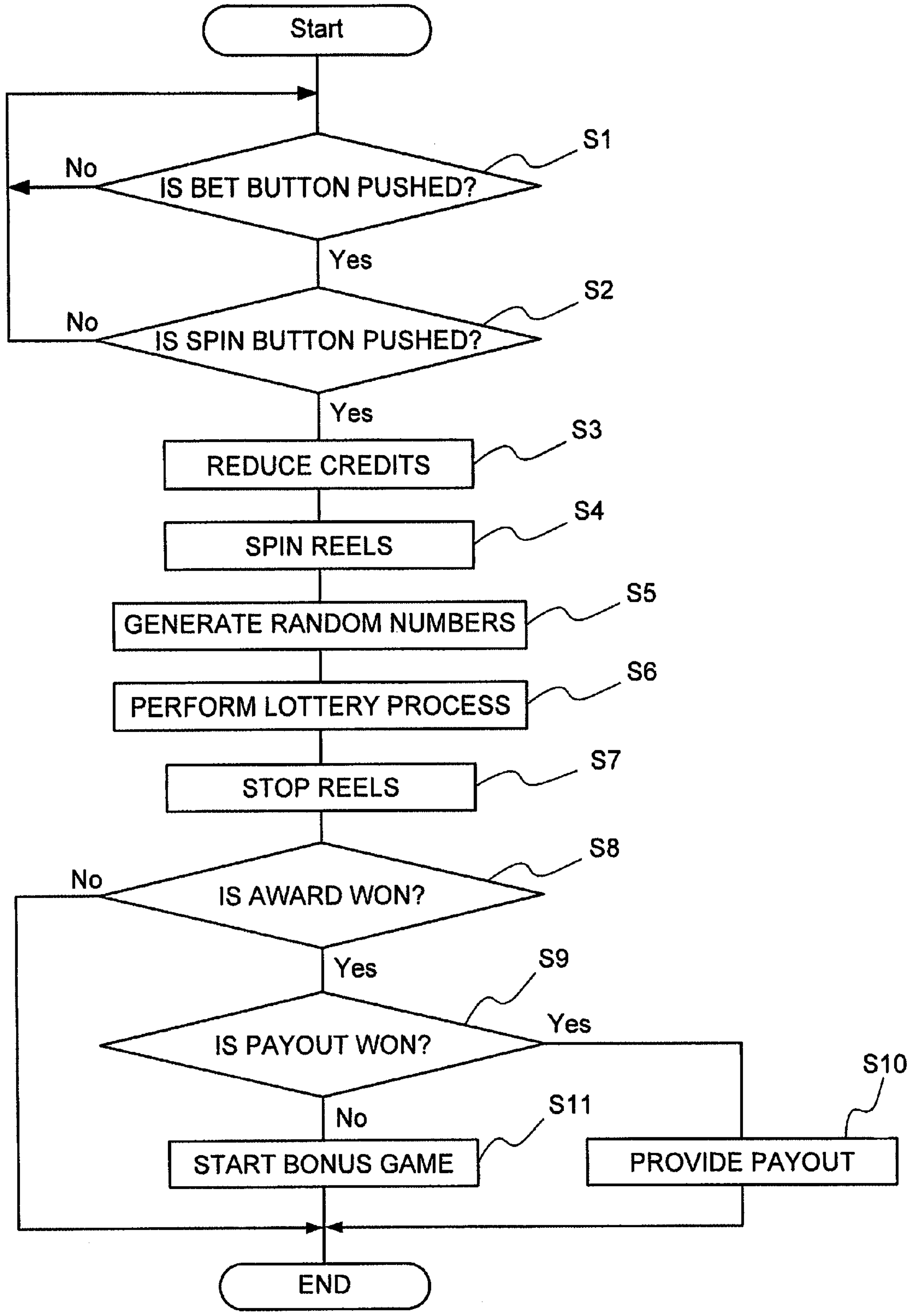
FIG. 8 is a flow chart of a slot game conducted by the slot machine shown in FIG. 2.

The flow of processes of a slot game will be described as follows (cf. FIG. 8). First, a player inserts coins or bills into the coin slot 5*a* or the bill slot 5*b*, respectively. The coin counter 22 then counts a number of each type of the coins and bills, and sends the numbers to the main control board 17. The main CPU 17*a* then serves as a credit manager unit as follows. The main CPU 17*a* first calculates the total amount of the coins and bills from the numbers counted by the coin counter 22, and next updates credit data stored in the main RAM 17*d* to increase credits by a number equivalent to the total amount. The main CPU 17*a* further updates the number displayed on the credit meter 12.

The player pushes the bet buttons 7*a* and 7*b* to place a desired bet (Step S1). The main CPU 17*a* receives signals from the bet buttons 7*a* and 7*b*, and decodes data indicating the bet from the signals. The main CPU 17*a* then updates the bet meter 12 to indicate the number of the bet. After that, the main CPU 17*a* enables the spin button 6.

The player pushes the spin button 6 (Step S2). The main CPU 17*a* then receives a signal from the spin button 6 and, serving as a credit manager unit, updates the credit data stored in the main RAM 17*d* to decrease credits by the number of the bet (Step S3). On the other hand, the main CPU 17*a* serves as a start signal generator unit and a display controller unit. More specifically, the main CPU 17*a* generates and transmits a start signal to the motor units 102 of the mechanical reels 100A-100E in synchronization with the signal from the spin button 6. Then, all the motor units 102 begin spinning the reel members 101 at the same time (Step S4). Accordingly, each symbol column continuously moves in the vertical direction in the display window 4.

At the same time, the main CPU 17*a* transmits the start signal to the random number generator 17*e*, which then generates and returns five random numbers in turn to the main CPU 17*a* (Step S5). Each random number is assigned to one of the mechanical reels 100A-100E. The main CPU 17*a* then serves as a lottery unit. More specifically, the main CPU 17*a* first retrieves a data item linked to each of the five random numbers from a stop position table stored in the main ROM 17*c*. The data item indicates a stop position of the reel member 101, i.e., the stop position table represents links between random numbers and stop positions of the reel member 101. An individual stop position table is prepared for each of the mechanical reels 100A-100E. The main CPU 17*a* thus determines the stop position of the reel member 101 in each of the mechanical reels 100A-100E at random. Accordingly, the arrangement of symbols visible in the display window 4 is determined at random.

In each stop position table, the same number of random numbers may be linked to each stop position of the reel member 101. In this case, any stop position has the same chance of being determined. Accordingly, the number of each type of symbols per reel member 101 determines the probability that the type of a symbol will appear in the display window 4. Here, it is desirable that the larger number of symbols can be displayed on each reel member 101 in order to increase variations in the probability that a type of a symbol will appear in the display window 4. A wider range of the variations allows a player to win a larger amount of payout. However, the larger number of symbols per reel member 101 requires the larger radius of the reel member 101, which is limited by the size of the entire slot machine 1. Actually, about 20 symbols can be displayed on each reel member 101. As a result, the above-mentioned type of stop position tables is suitable for a slot machine that can provide a player with relatively small amount of payouts.

The slot machine 1 preferably adopts virtual reels for determining stop positions of reel members 101. More specifically, in each stop position table, different numbers of random numbers are linked to different stop positions of the reel member 101. In this case, different stop positions have different chances of being determined. This is equivalent to the case where a larger number of symbols are virtually displayed on each reel member (i.e., virtual reel), and each symbol has the same chance of appearing in the display window 4. Thus, variations in the probability that a type of a symbol will appear in the display window 4 are freely increased, regardless of the number and types of symbols actually displayed on each reel member 101 and the size of the reel member 101. Accordingly, the slot machine 1 can provide a player with a larger amount of payout regardless of any limitation in size.

The main CPU 17*a*, serving as a winning judgment unit, checks if a winning combination will be included in the arrangement of symbols determined from the five random numbers and the stop position tables (Step S6). More specifically, the main CPU 17*a* first retrieves the combination of the five random numbers from a winning combination table stored in the main ROM 17*c*. The winning combination table represents links between combinations of five random numbers and awards. Preferably, different types of winning combination tables are used in special games from those in usual games. If the combination of the generated random numbers was found in the winning combination table, the main CPU 17*a* then determines that an award linked to the combination will be provided to the player.

After the lottery process and a predetermined time has elapsed from the reception of the start signal, the main CPU 17*a* serves as a display controller unit again, i.e., commands the motor units 102 of the mechanical reels 100A-100E to stop the reel members 101 at the respective stop positions determined in the lottery process (Step S7). Then, the motor units 102 stop the spin of the reel members 101 in turn. As a result, the arrangement of symbols corresponding to the determined stop positions will appear in the display window 4.

If the lottery process results in the winning of an amount of a payout (Yes at Steps S8 and S9), the main CPU 17*a* first commands the sub-control board 21 to produce specific sound and visual effects after the stop of all the reel members 101. The sub-CPU 21*a* then controls the sound LSI 21*f* and the monitor controller 21*g* to produce the sound and visual effects by using the speaker 9 and the monitor 11. The main CPU 17*a* next serves as an award processor unit to pay credits equivalent to the payout to a player (Step S10). More specifically, the main CPU 17*a* updates the credit data stored in the main RAM 17*d* to increase the player's credits by the amount of the payout.

If the lottery process results in the winning of a right to play a special game (Yes at Step S8 and No at Step S9), the main CPU 17*a* first commands the sub-control board 21 to produce specific sound and visual effects after the stop of all the reel members 101. The sub-CPU 21*a* then controls the sound LSI 21*f* and the monitor controller 21*g* to produce the sound and visual effects by using the speaker 9 and the monitor 11. The main CPU 17*a* next serves as an award processor unit to change game status from a normal mode to a specific mode for a special game of the type determined by the type of the award (Step S11).

Figure 1:
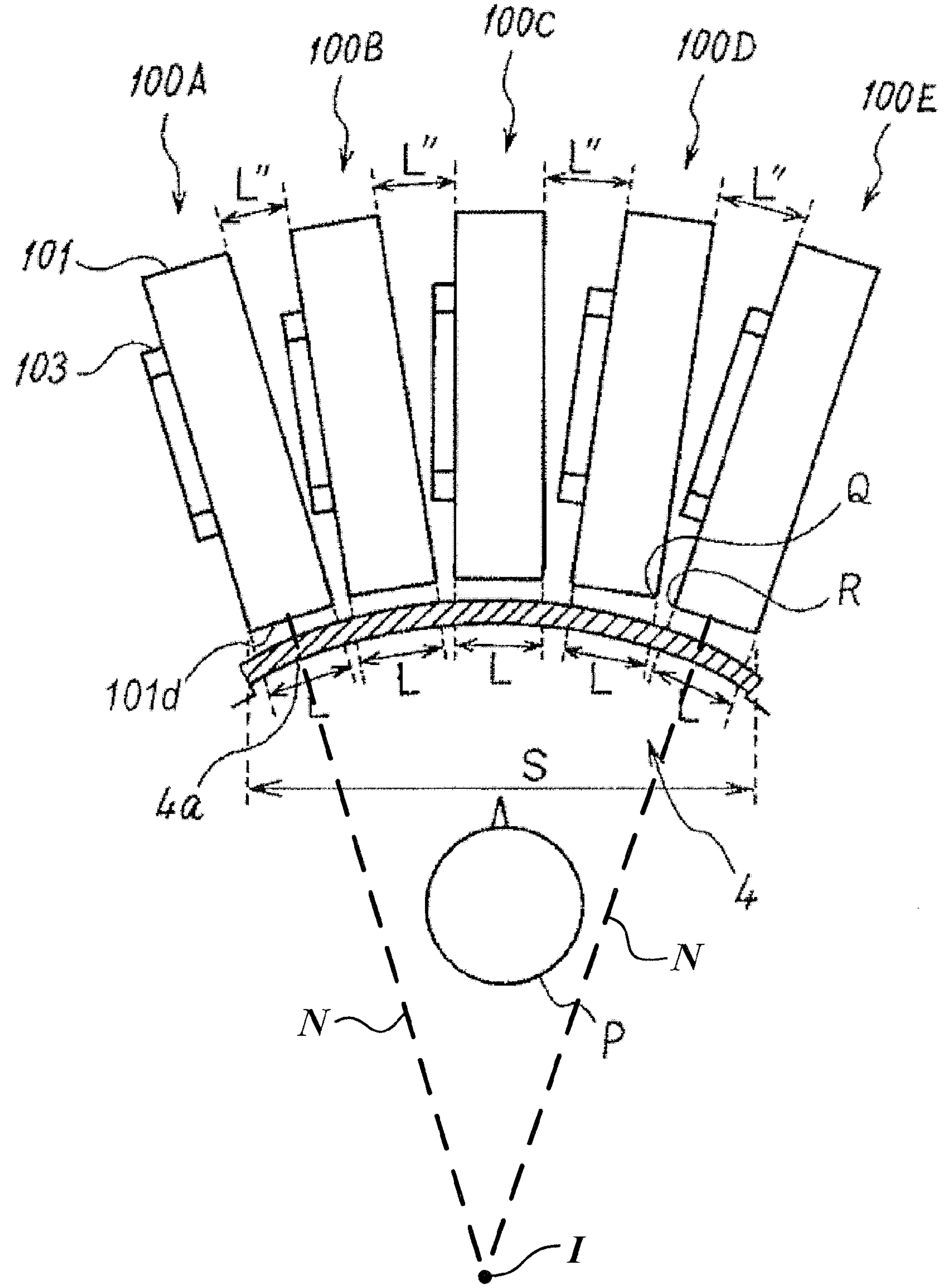
FIG. 1 is a schematic top view of the configuration of mechanical reels installed in a slot machine according to an embodiment 1 of the present invention.
Figure 9:
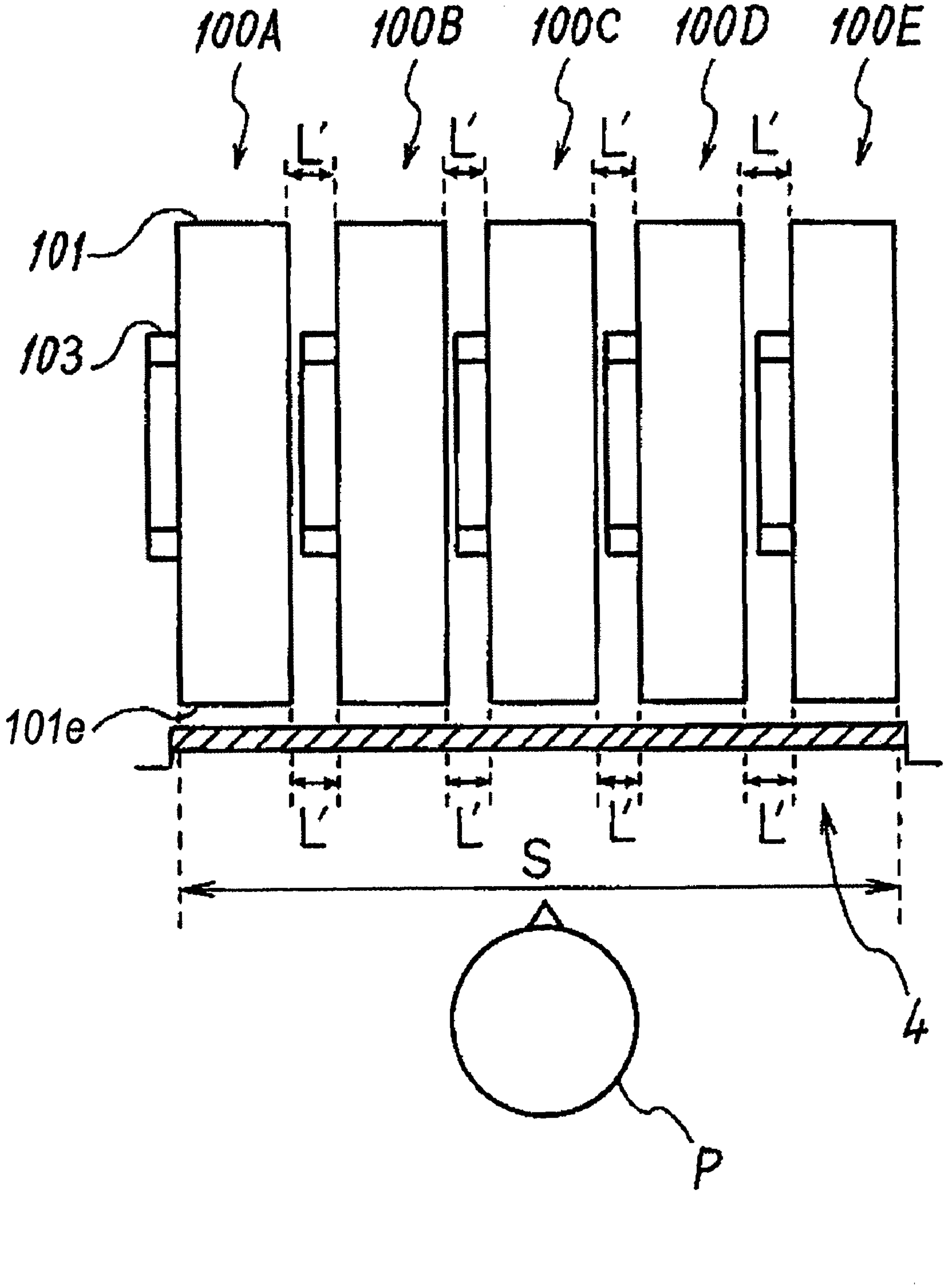
FIG. 9 is a schematic top view of the configuration of mechanical reels installed in a prior art slot machine.

The mechanical reels 100A-100E are preferably positioned as in FIG. 1. Normal directions N of the circumferential surfaces at the forward ends 101*d* of the reel members 101 intersect at substantially the same point I in front of the display window 4. As a result, the forward ends 101*d* of all the reel members 101 oppose a player P. Accordingly, the player's line of sight is easy to place in the normal direction of the circumferential surface on which each symbol column is displayed. Thus, any symbol column is easy for the player P to see with uniformly bright clarity. In contrast, the prior art slot machine has mechanical reels 100A-100E coaxially positioned as shown in FIG. 9. The forward ends 101*e* of the reel members 101 are placed on the same flat plane. Accordingly, normal directions of the circumferential surfaces at the forward ends 101*e* are parallel with each other in front of the display window 4. In this case, a player P usually sees the forward ends 101*e* of the first and fifth mechanical reels 100A and 100E, which are placed at both ends of the display window 4, from a larger angle than the forward ends 101*e* of the third mechanical reel 100C placed at the center of the display window 4. Accordingly, symbol columns on the first and fifth mechanical reels 100A and 100E are less visible than those on the third mechanical reel 100C.

The forward ends 101*d* of the reel members 101 are placed at a uniform distance from a player P in the slot machine 1, as shown in FIG. 1. The forward ends 101*d* are preferably placed on a substantially smooth envelope curve. In contrast, the forward ends 101*e* of the reel members 101 are placed at longer and different distances from a player P in a prior art slot machine, as shown in FIG. 9. Accordingly, symbol columns displayed on the slot machine 1 of FIG. 1 is easier for the player P to see with uniformly bright clarity than symbol columns on the prior art slot machine of FIG. 9.

A transparent curved panel 4*a* is preferably placed across the display window 4, as shown in FIG. 1. The panel 4*a* is more preferably opposed to each of the forward ends 101*d* of the reel members 101 at a fixed distance from the forward ends 101*d*. This also enhances the visibility of symbol columns throughout the display window 4, in contrast to a flat transparent panel as shown in FIG. 9.

The mechanical reels 100A-100E in the slot machine 1 are positioned at ribs of a fan when seen from the top as shown in FIG. 1. In particular, the distance between forward ends Q and R of the circumferential surfaces of adjacent mechanical reels is sufficiently smaller than the distance L" between back ends of the adjacent mechanical reels. This can reduce a gap between adjacent symbol columns, while maintaining a sufficiently large distance between the center portions of the adjacent mechanical reels within which the motor unit 102 and the supporting member 103 are to be placed. The smaller gap between adjacent symbol columns can enhance the visibility of all the five symbol columns. In addition, the ratio of the width L per symbol column to the width S of the entire display window 4 can be minimized. This can enhance flexibility in design of the front panel 3 since the region thereon other than the display window 4 can be enlarged. In contrast, the mechanical reels 100A-100E in the prior art slot machine of FIG. 9 are parallel to each other. Accordingly, the distance L' between forward ends 101*e* of the circumferential surfaces of adjacent mechanical reels is equal to the distance L' between back ends of the adjacent mechanical reels. Thus, a gap between adjacent symbol columns cannot be reduced below a necessary distance between the center portions of the adjacent mechanical reels. Therefore, the slot machine 1 of FIG. 1 enhances the visibility of all five symbol columns more than the prior art slot machine of FIG. 9.

Figure 10:
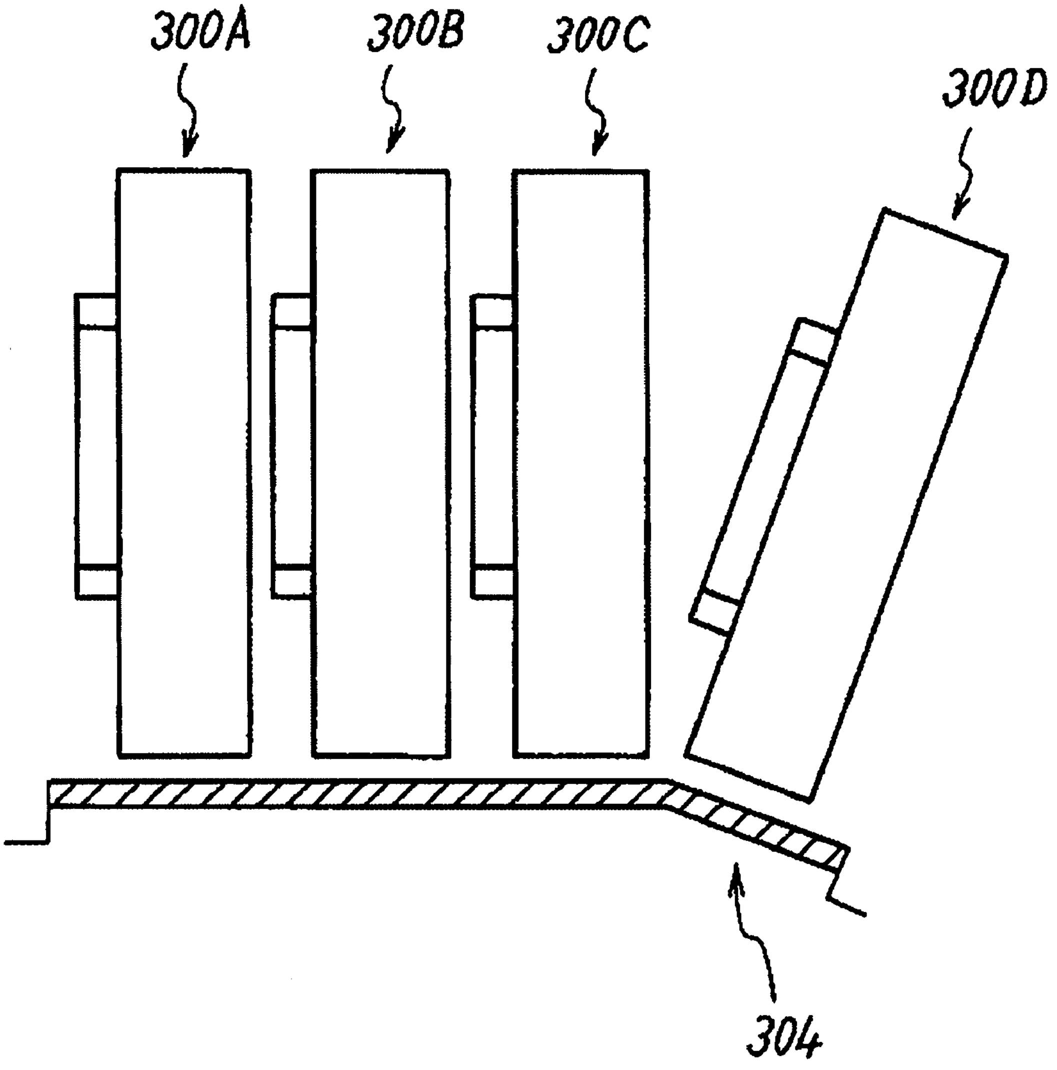
FIG. 10 is a schematic top view of a modified configuration of mechanical reels installed in a slot machine according to the embodiment 1 of the present invention.

Alternatively, four mechanical reels 300A-300D may be positioned in the slot machine 1 as shown in FIG. 10. Here, each mechanical reel 300A-300D has the same structure as the mechanical reels 100A-100E (cf. FIGS. 5 and 6). Normal directions of the circumferential surfaces at the forward ends of adjacent three mechanical reels 300A, 300B, and 300C are parallel with each other in front of the display window 4. The forward ends of the three mechanical reels 300A-300C are in particular placed on the same flat plane. On the other hand, a normal direction of the circumferential surface at the forward end of the fourth mechanical reel 300D intersects the normal directions of the other mechanical reels 300A-300C in front of the display window 4. In this case, the forward ends of all the mechanical reels 300A-300D substantially oppose a player P. Accordingly, any symbol column is easy for the player P to see with uniformly bright clarity.

The slot machine 1 shown in FIG. 10 preferably uses the three mechanical reels 300A-300C placed in parallel positions in usual slot games, and adds the fourth mechanical reel 300D placed in a slanting position to the other mechanical reels 300A-300C. The fourth mechanical reel 300D is preferably used in bonus games. Note that a backlight unit 106 (cf. FIG. 6) installed in the fourth mechanical reels 300D is preferably turned off during usual games. Alternatively, the visible portion on the fourth mechanical reels 300D in the display window 4 may be covered with a panel or the like during usual games. Especially in the "scatter" scheme, the addition of the fourth mechanical reel 300D increases the probability that each type of symbols will appear in the display window 4 since a larger number of symbols are visible in the display window 4. Accordingly, a player has a better chance of winning in bonus games.

Embodiment 2

A second preferred embodiment of the present invention is a slot machine preferably installed in a casino. The slot machine has the same configuration as the slot machine 1 of the embodiment 1, except for an electronic display device 200 with which the mechanical reels 100A-100E are replaced. Details of other components can be found in the above description about the embodiment 1.

Figure 11:
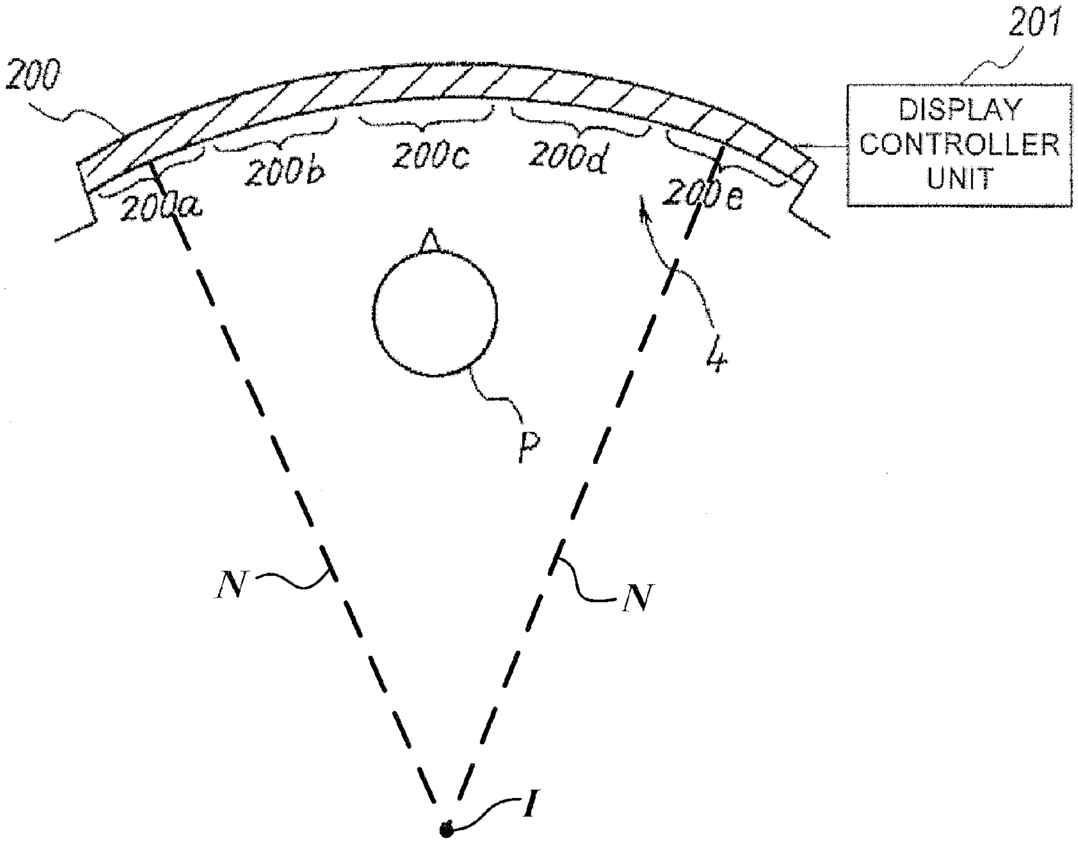
FIG. 11 is a schematic top view of the configuration of video reels displayed on a slot machine according to an embodiment 2 of the present invention.

As shown in FIG. 11, the electronic display device 200 is mounted across the display window 4, and controlled by a display controller unit 201. The display controller unit 201 is preferably implemented in the main control board 17 (cf. FIGS. 3 and 7). The electronic display device 200 includes a flexible or curved display device, preferably, one or more pieces of electronic paper. Alternatively, the electronic display device 200 may be a flexible LCD or an OLED. A plurality of flat display panels (e.g., LCDs or PDPs) may be placed on a substantially smooth envelope curve within the display window 4, and thereby constitute the electronic display device 200. The electronic display device 200 preferably has a screen that is smoothly or stepwise concave in a horizontal direction, as shown in FIG. 11. More preferably, normal directions N of portions of the screen aligned in a horizontal direction intersect at substantially the same point I in front of the display window 4. The electronic display device 200 preferably displays five symbol columns 200*a*, 200*b*, 200*c*, 200*d*, and 200*e* in a graphic form (i.e., video reels) on the screen. The main CPU 17*a* controls spins and stops of the video reels 200*a*-200*e* and determines stop positions thereof at random in manners similar to those for the mechanical reels 100A-100E. Surfaces of the screen on which the five symbol columns 200a-200e are displayed oppose a player P. Thus, any symbol column 200a-200e is easy for the player P to see with uniformly bright clarity. In particular, the symbol columns 200a-200e have a uniformly high level of image quality, even if the electronic display device 200 uses an LCD with a limited viewing angle, since the player P can see each symbol column from a small angle. This facilitates increasing the screen size of the electronic display device 200, and enhancing the flexibility in design of the slot machine 1.

Embodiment 3

A third preferred embodiment of the present invention is a slot machine preferably installed in a casino. The slot machine has the same configuration as the slot machine 1 of the first embodiment, except for electronic display devices 400 and 500 added to mechanical reels 400A-400C and 400a. Details of other components can be found in the above description about the embodiment 1.

Figure 12:
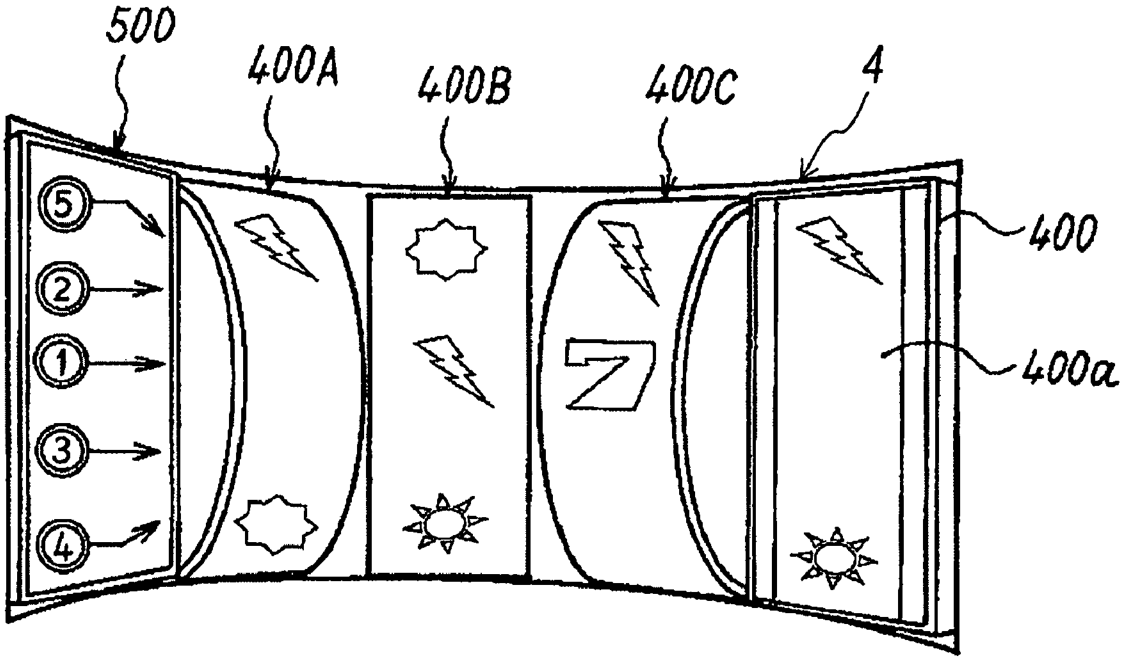
FIG. 12 is a front view of mechanical and video reels displayed on a slot machine according to an embodiment 3 of the present invention.

As shown in FIG. 12, three mechanical reels 400A, 400B, and 400C are placed at the center of the display window 4, and two electronic display devices 400 and 500 are placed at both ends of the display window 4.

Each mechanical reel 400A-400C has the same structure as the mechanical reels 100A-100E (cf. FIGS. 5 and 6). The mechanical reels 400A-400C are preferably positioned such that normal directions of the circumferential surfaces at the forward ends of the mechanical reels 400A-400C intersect at substantially the same point in front of the display window 4. As a result, the forward ends of all the mechanical reels 400A-400C oppose a player. Thus, any symbol column is easy for the player to see with uniformly bright clarity.

The electronic display devices 400 and 500 are controlled by a display controller unit (not shown in FIG. 12), which is preferably implemented in the main control board 17 (cf. FIGS. 3 and 7). The electronic display devices 400 and 500 are preferably a flat display panel, more preferably, electronic paper, an LCD, a PDP, or an OLED. The electronic display devices 400 and 500 preferably has a screen in a slanted position with respect to the forward ends of the second mechanical reel 400B placed at the center of the display window 4. More preferably, normal directions of the screen intersect at substantially the same point where the normal directions of the circumferential surfaces of the mechanical reels 400A-400C intersect. The right-hand electronic display device 400 preferably displays an additional symbol column 400a in a graphic form (i.e., video reels) on the screen. The main CPU 17a controls spins and stops of the additional symbol column 400a and determines a stop position thereof at random in manners similar to those for the mechanical reels 400A-400C. The left-hand electronic display device 500 preferably displays information and a guide about games, and/or produces visual effects on the screen. The left-hand electronic display device 500 may display another video reel. Surfaces of the screens of both the electronic display devices 400 and 500 oppose a player. Thus, the additional symbol column 400a and images displayed on the left-hand electronic display device 500 are easy for the player to see with bright clarity, even if the electronic display devices 400 and 500 use an LCD with a limited viewing angle, since the player can see the images from a small angle.

This slot machine is of a hybrid reel type, i.e., has the mechanical reels and the video reel(s). The hybrid reel slot machines retain the real three-dimensional motion of symbols caused by the spins of the mechanical reels. This three-dimensional motion causes many players to prefer mechanical reels to video reels. On the other hand, hybrid reel slot machines can easily change symbols depending on the status or type of games, since the change in symbols require only updates of image data used by the electronic display devices. This facilitates model changes for slot machines and brilliant visual effects in games without the replacement of portions of the mechanical reels. In addition, hybrid reel slot machines can freely expand the range of odds in games, since the sizes of the mechanical reels do not limit the number of symbols per reel. Accordingly, hybrid reel slot machines are especially suitable for use in slot machines placed in arcades and casinos.

The slot machine 1 shown in FIG. 12 preferably uses the three mechanical reels 400A-400C in usual slot games, and adds the video reel 400a to the other mechanical reels 400A-400C in bonus games. In addition, another video reel may be displayed on the left-hand electronic display device 500 in another type of bonus games. Players can enjoy real three-dimensional motions of symbols caused by the spins of the mechanical reels 400A-400C in usual games. On the other hand, players can enjoy wide variety in games and visual effects caused by the video reel 400a in bonus games.

GENERAL INTERPRETATION OF TERMS

In understanding the scope of the present invention, the term "configured" as used herein to describe a component, section or portion of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "unit," "section," "portion," "member" or "element" when used in the singular can have the dual meaning of a single portion or a plurality of portions. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only preferred embodiments have been chosen to illustrate the present invention, it will be apparent to those skilled in the art from this disclosure that various changes and modifications can be made herein without departing from the scope of the invention as defined in the appended claims. Furthermore, the foregoing description of the preferred embodiments according to the present invention is provided for illustration only, and not for the purpose of limiting the invention as defined by the appended claims and their equivalents.

What is claimed is:

1. A slot machine comprising:

a display unit including a plurality of regions, each region configured to display one of a plurality of symbol columns, each symbol column including two or more types of symbols arranged in a predetermined order, normal directions of surfaces of at least two of the regions of the display unit intersecting in front of the display unit;

a console unit configured to accept data from a player;

a credit manager unit configured to store credit data indicating an amount of credits available to the player, and update the credit data to reduce the amount of credits by an amount of a bet indicated by bet data when the console unit has accepted the bet data from the player;

a start signal generator unit configured to generate a start signal after the credit manager unit has reduced the credits by the bet;

a lottery unit configured to determine an arrangement of symbols to be displayed on the display unit in response to the start signal;

a display controller unit configured to start continuously moving the symbol columns displayed on the display unit in response to the start signal, and after that, stop the symbol columns and display the arrangement of symbols that the lottery unit has determined;

a winning judgment unit configured to check if a winning combination will be included in the arrangement of symbols; and an award processor unit configured to provide the player with an award in accordance with the bet data and the type of the winning combination that winning judgment unit has found in the arrangement of symbols.

2. A slot machine comprising:

a display unit including a region configured to display a plurality of symbol columns and rows, each symbol column including two or more types of symbols arranged in a predetermined order, normal directions of surfaces of the region on which the symbol columns placed at both ends of the symbol rows are displayed, intersecting in front of the display unit, the display unit further including a plurality of mechanical reels including a circumferential surface on which each symbol column is displayed, and a motor unit configured to rotate the mechanical reels, a portion of the circumferential surface of each mechanical reel is visible in the region of the display unit, normal directions of the circumferential surfaces of the mechanical reels placed at both ends of the region intersect in front of the display unit;

a console unit configured to accept data from a player;

a credit manager unit configured to store credit data indicating an amount of credits available to the player, and update the credit data to reduce the amount of credits by an amount of a bet indicated by bet data when the console unit has accepted the bet data from the player;

a start signal generator unit configured to generate a start signal after the credit manager unit has reduced the credits by the bet;

a lottery unit configured to determine an arrangement of symbols to be displayed on the display unit in response to the start signal;

a display controller unit configured to start continuously moving the symbol columns displayed on the display unit in response to the start signal, and after that, stop the symbol columns and display the arrangement of symbols that the lottery unit has determined;

a winning judgment unit configured to check if a winning combination will be included in the arrangement of symbols; and an award processor unit configured to provide the player with an award in accordance with the bet data and the type of the winning combination that winning judgment unit has found in the arrangement of symbols.

3. A slot machine according to the claim 2, wherein normal directions of the circumferential surfaces of the mechanical reels intersect at substantially the same point in front of the display unit.

4. A slot machine according to the claim 3, wherein the mechanical reels are adjacent, a distance between forward ends of the circumferential surfaces of the adjacent mechanical reels is smaller than a distance between back ends of the adjacent mechanical reels.

5. A slot machine according to the claim 2, wherein the display unit further includes a transparent panel placed across the region of the display unit and opposed to each of the circumferential surfaces of the mechanical reels at a fixed distance from the circumferential surfaces.

6. A slot machine according to the claim 1, wherein the display unit further includes an electronic display device configured to display the symbols in a graphic form on a screen with the regions being defined relative to the screen such that normal directions of the regions at opposite sides of the screen intersect in front of the display unit.

7. A slot machine comprising:

a display unit including a region configured to display a plurality of symbol columns and rows, each symbol column including two or more types of symbols arranged in a predetermined order normal directions of surfaces of the region on which the symbol columns placed at both ends of the symbol rows are displayed, intersecting in front of the display unit, the display unit further including a plurality of mechanical reels including a circumferential surface on which one of the symbol columns is displayed, a portion of the circumferential surface is visible in the region of the display unit, a motor unit configured to rotate the mechanical reels, and an electronic display device configured to display the remainder of the symbol columns in a graphic form on a screen placed at the region, normal directions of the circumferential surfaces of the mechanical reels placed at both ends of the region, or normal directions of surfaces of the screen on which the symbol columns placed at both ends of the symbol rows are displayed, intersecting in front of the display unit, a console unit configured to accept data from a player;

a credit manager unit configured to store credit data indicating an amount of credits available to the player, and update the credit data to reduce the amount of credits by an amount of a bet indicated by bet data when the console unit has accepted the bet data from the player;

a start signal generator unit configured to generate a start signal after the credit manager unit has reduced the credits by the bet;

a lottery unit configured to determine an arrangement of symbols to be displayed on the display unit in response to the start signal;

a display controller unit configured to start continuously moving the symbol columns displayed on the display unit in response to the start signal, and after that, stop the symbol columns and display the arrangement of symbols that the lottery unit has determined;

a winning judgment unit configured to check if a winning combination will be included in the arrangement of symbols;

an award processor unit configured to provide the player with an award in accordance with the bet data and the type of the winning combination that winning judgment unit has found in the arrangement of symbols.

* * * * *